US007342196B2

(12) United States Patent
Koenig

(10) Patent No.: US 7,342,196 B2
(45) Date of Patent: Mar. 11, 2008

(54) PLASMA SPRAYING APPARATUS AND ALSO A METHOD FOR MONITORING THE CONDITION OF A PLASMA APPARATUS

(75) Inventor: Peter Koenig, Sarmenstorf (CH)

(73) Assignee: Sulzer Metco AG, Wohlen (CH)

( * ) Notice: Subject to any disclaimer, the term of this patent is extended or adjusted under 35 U.S.C. 154(b) by 249 days.

(21) Appl. No.: 11/202,723

(22) Filed: Aug. 12, 2005

(65) Prior Publication Data

US 2006/0057301 A1 Mar. 16, 2006

(30) Foreign Application Priority Data

Sep. 10, 2004 (EP) ................................. 04405570

(51) Int. Cl.
*B23K 10/00* (2006.01)

(52) U.S. Cl. .......................... 219/121.47; 219/121.59; 219/76.16; 219/121.55

(58) Field of Classification Search ........... 219/121.47, 219/121.59, 121.54, 121.51, 121.55, 121.48, 219/76.16, 76.15
See application file for complete search history.

(56) References Cited

U.S. PATENT DOCUMENTS 4,603,257 A 7/1986 Packer et al.
4,878,953 A 11/1989 Saltzman et al.
4,941,778 A 7/1990 Lehmann
5,717,187 A 2/1998 Rogozinski et al.
5,961,856 A * 10/1999 Fusaro et al. .......... 219/121.47
6,124,563 A * 9/2000 Witherspoon et al. . 219/121.47

FOREIGN PATENT DOCUMENTS

JP 09159610 6/1997

* cited by examiner

*Primary Examiner*—Mark Paschall
(74) *Attorney, Agent, or Firm*—Townsend and Townsend and Crew LLP

(57) ABSTRACT

The invention relates to a plasma spraying apparatus (1) including a plasma torch (2) for heating up a spray powder (3) in a heating zone (4) and a metering unit (5) for metering the spray powder (3), the metering unit (5) for conveying the spray powder (3) into an injection unit (6) by means of a conveyor gas (7) under a predetermined pressure being connected with a conveyor gas unit (9) via a conveyor gas line (8). The injection unit (6) has an inlet (61) and an outlet (62) designed as a powder injector (62) so that the spray powder (3) can be supplied from the metering unit (5) to the injector unit (6) through the inlet (61) by means of the conveyor gas (7) via an injector line (10) to the injector unit (6). In this arrangement the injector unit (6) is designed and arranged in such a way that the spray powder (3) can be brought into the heating zone (4) by the conveyor gas (7) emerging from the powder injector (62), with a pressure sensor (11) for the detection of the pressure (P) of the conveyor gas (7) being provided for monitoring the condition of the plasma spraying apparatus (1). The invention further relates to a method for monitoring the condition of a plasma spraying apparatus (1).

10 Claims, 1 Drawing Sheet

PLASMA SPRAYING APPARATUS AND ALSO A METHOD FOR MONITORING THE CONDITION OF A PLASMA APPARATUS

BACKGROUND OF THE INVENTION

The invention relates to a plasma spraying apparatus and also to a method for monitoring the condition of a plasma spraying apparatus.

Plasma spraying apparatuses, for example for coating the surface of a workpiece with a spray powder, are well known in the prior art, and are used widely in completely different technical fields. Known plasma spraying apparatuses often comprise a plasma spray gun, a high power direct-current source, a cooling aggregate and also a powder conveyer. For the protection of people and the environment, the spraying is often carried out in closed spaces which are equipped with vacuum filters, dust filters and noise protection devices.

In atmospheric plasma spraying an arc is triggered in a plasma torch between a water-cooled anode and a likewise water-cooled tungsten cathode. A process gas, usually argon or nitrogen or a mixture of an inert gas with nitrogen or hydrogen, is converted into the plasma state in the arc and a plasma beam with a temperature of up to 20.000 K develops. Particle speeds of 200 to 350 m/s are achieved through the thermal expansion of the gases. The powdery spray material enters the plasma beam with the help of a conveyor gas either axially or radially inside or outside of the anode region.

It goes without saying that in particular those components which are arranged close to the plasma torch can be affected in time by the extreme temperatures. The spray powder itself, which as a rule has aggressive and abrasive mechanical characteristics, also leads in time to wear on components of many different kinds, such as the powder injector, supply lines, seals, valves or the metering unit for the metering of the spray powder. Furthermore, a continuously constant quality of the spray powder is not always guaranteed. Thus it can, for example, happen that a powder charge contains particles which are much too large, so that clogging or narrowing of the supply cross-sections results at critical positions and the powder supply is reduced unduly or even interrupted completely. The possible operating faults which are only listed here by way of example, which occur during operation of a plasma spraying apparatus, all lead as a rule to the sprayed layers no longer meeting the required specifications so that the relevant workpieces have to be rejected in the worst case. Relatively minor damage or faults which can be remedied easily if recognized in time can, if they remain undetected, lead in the long run to further system components being damaged or rendered useless, which can lead to considerable service and repair costs that would not have occurred if the initially minor damage or faults had been discovered in time.

SUMMARY OF THE INVENTION

An object of the present invention is thus to propose a plasma spraying apparatus and also a method with which faults and the damage of components of the plasma spraying apparatus can be recognized at an early stage.

The plasma spraying apparatus according to the invention includes a plasma torch for heating up a spray powder in a heating zone and a metering unit for metering the spray powder, the metering unit being connected to a conveyor gas unit via a conveyor gas line for conveying the spray powder into an injection unit by means of a conveyer gas under a predetermined pressure. The injector unit has an inlet and an outlet designed as a powder injector, so that the injector unit can be supplied from the metering unit through the inlet. In this arrangement the injector unit is designed and arranged in such a way that the spray powder can be brought into the heating zone by means of the conveyor gas emerging from the powder injector, with a pressure sensor for the detection of the pressure of the conveyor gas being provided for monitoring the condition of the plasma spraying apparatus.

In accordance with the invention a pressure sensor is thus provided for the recognition of the pressure of the conveyor gas so that the gas pressure of the conveyor gas can be monitored. If the plasma spraying apparatus is in perfect condition, the pressure of the conveyor gas has a certain value or, in the operating state of the plasma spraying apparatus, lies within a predetermined pressure region which registers the trouble-free condition of the plasma spraying apparatus. The concrete value of the pressure or the exact pressure range of the conveyor gas which corresponds to a trouble-free condition of the plasma spraying apparatus and which can, for example, lie between 1000 mbar and 2000 mbar, and preferably at approximately 1300 mbar, can depend on both the working pressure, which can be predetermined by the conveyor gas unit, and also on the type of plasma spraying apparatus used, on the spray powder or on the operating conditions under which the plasma spraying apparatus can be operated.

Should the condition of the plasma spraying apparatus or the condition of one of its components deteriorate, for example the condition of the powder injector in operation, then this has been shown to have an effect on the pressure of the carrier gas. Thus, by way of example, the injector unit, in particular the powder injector, can be obstructed by spray powder to a greater or lesser extent, which can for example become noticeable by an increase in pressure in the conveyor gas which is detected by the pressure sensor. This can occur for example if the spray powder used contains particles which exceed a certain size. If a rise in the pressure is detected by the pressure sensor, corresponding countermeasures can be taken immediately so that deterioration in the quality of a layer to be sprayed using the plasma spraying apparatus can be prevented.

A drop in pressure can also indicate a deterioration in the condition of the plasma spraying apparatus, for example in the injector unit. It is thus possible, for example, that the nozzle opening is stretched or damaged in time by the spray powder, so that an ideal introduction of the spray powder into the plasma flame is no longer guaranteed. The injector unit can also be damaged, for example deformed, by the extremely high temperatures of the plasma flame in the course of time, or can also wear faster than intended due to material faults or faults in manufacture.

Depending on the nature of the damage, the pressure of the carrier gas can also fluctuate or oscillate in a characteristic manner for example, which can have a negative effect on the spraying process.

In this arrangement other damage and/or damage to other components of the plasma spraying apparatus can be detected by measuring the pressure of the carrier gas using the pressure sensor. For example the pressure of the carrier gas can depend on the amount of spray powder which is made available by the metering unit per time unit, so that changes in the pressure of the carrier gas point to irregularities in the preparation or the supply of the spray powder. Leakages in the system due to worn seals for example, which can be provided at the injector unit, at the metering unit, at the injector line, at the conveyor gas line, or at a different component of the plasma spraying apparatus among positions, can also be detected particularly easily by measurement of the pressure of the carrier gas so that countermeasures can be taken immediately and thus further damage is preventable. It goes without saying that even with wear of the system components occurring in the course of time, cracks or other leakages, in particular in the metering unit, the conveyor gas line, the injector line, the injector unit or other system components of the plasma spraying apparatus, can be detected reliably in accordance with the invention by measurement of the pressure of the carrier gas.

In this arrangement particular damage can lead to completely characteristic alterations in the pressure of the carrier gas, so that in certain cases even the nature of the damage can be discerned from the nature of the alteration in the gas pressure of the carrier gas. Thus, for example, in a particular plasma spraying apparatus, a reduction of 1 $mm^2$ of the cross-section of the outlet opening of the powder injector shows a change of the pressure in the carrier gas of approximately 110 mbar. If a rise in pressure such as this is detected, an ongoing spraying procedure can, for example, be interrupted to remedy the corresponding damage to the plasma spraying apparatus.

The pressure sensor for measurement of the pressure of the conveyor gas can in this arrangement be provided at different places. In a preferred embodiment the pressure sensor is provided in the conveyor gas line.

In a different embodiment, on the other hand, the pressure sensor is in contrast provided in the injector line.

In this arrangement it is also possible for more than one pressure sensor to be provided in a plasma spraying apparatus in accordance with the invention. Thus for example one pressure sensor can be advantageously placed in the injector line and one pressure sensor in the conveyor gas line, so that two values of the pressure of the carrier gas can be determined. Moreover a plurality of pressure sensors can also be provided at certain indicated positions. Thus, by way of example, the drop in pressure can be measured and observed over the conveyor gas line and/or over the injector line and/or over the metering unit. If a plurality of pressure sensors is provided at different places, damage which occurs can be localized more easily and precisely. Moreover the nature of damage which occurs, for example a leak in a line, problems with the metering unit while metering the spray powder or an obstruction of the powder injector or stretching of the cross-section of the powder injector or different damage which can occur during operation of the plasma spraying apparatus in accordance with the invention, can be classified and localized more simply. That is to say by use of a plurality of pressure sensors the different kinds of damage can be differentiated more simply and can be assigned more easily.

Whereas, in a particularly simple embodiment, the pressure sensor is merely connected with a pressure indicator which indicates the pressure of the carrier gas, so that the operating personnel of the plasma spraying apparatus can take appropriate measures at a certain pressure reading, in an embodiment which is important in practice, the pressure sensor for monitoring the pressure of the conveyor gas is connected signal-wise with a monitoring unit. The monitoring unit can evaluate the pressure of the carrier gas measured by the pressure sensor for example and generate a corresponding optical, acoustic or a different signal, for example, via an output unit for example, via a computer monitor for example, so that the operating personnel can take appropriate measures. It is also possible for the monitoring unit to determine the nature of the damage from the pressure data measured and to issue this information via the output unit.

In this arrangement, in a further embodiment, the monitoring unit includes a control unit for the control and/or regulation of the pressure and/or of the magnitude of the flow of the conveyor gas and/or of a supply quantity of the spray powder and/or of the metering of the spray powder and/or of a heating power of the plasma torch and/or of other operating parameters and/or of a system component of the plasma spraying apparatus. Not every change in the pressure of the supply gas makes the exchange or the repair of a system component immediately necessary. For example a current spraying procedure can often still be finished by the adaptation of certain operating parameters, for example the amount of spray powder conveyed per time unit, the value of the pressure and/or the flow quantity of the conveyor gas and/or the power of the plasma torch and/or other operating parameters. The adaptation of the above-named and other operating parameters can preferably be automatically undertaken by the control unit in dependence on the pressure and/or certain changes of the pressure of the conveyor gas, so that a current spraying procedure can be constantly automatically monitored and optimized. Adaptations such as these can also be undertaken manually by the operating personnel.

In this arrangement the pressure sensor itself is preferably a mechanical, optical, magnetic or an electric pressure sensor known per se, in particular a piezoelectric pressure sensor.

The invention further relates to a method for the monitoring of the condition of a plasma spraying apparatus wherein a spray powder is metered by means of a metering unit and a injector unit is provided which has an inlet and an outlet designed as a powder injector, wherein the spray powder is supplied out of the metering unit to the injector unit via an injector line through the inlet by means of a conveyor gas under a predetermined pressure and the spray powder is brought into a heating zone by means of the conveyor gas emerging from the power injector, with the pressure of the conveyor gas being monitored by means of a pressure sensor.

In an embodiment of the method in accordance with the invention which is significant for practical use, a monitoring unit, which includes a control unit, is connected signal-wise with the pressure sensor, with the pressure of the conveyor gas and/or the flow quantity of the carrier gas and/or a supply quantity of the spray powder and/or a heating power of the plasma torch and/or a different operating parameter and/or a system component of the plasma spraying apparatus being monitored and/or controlled and/or regulated.

BRIEF DESCRIPTION OF THE DRAWINGS

The invention will be explained in more detail in the following with the help of the drawing which shows in a schematic representation.

DESCRIPTION OF THE PREFERRED EMBODIMENTS

Figure 1:
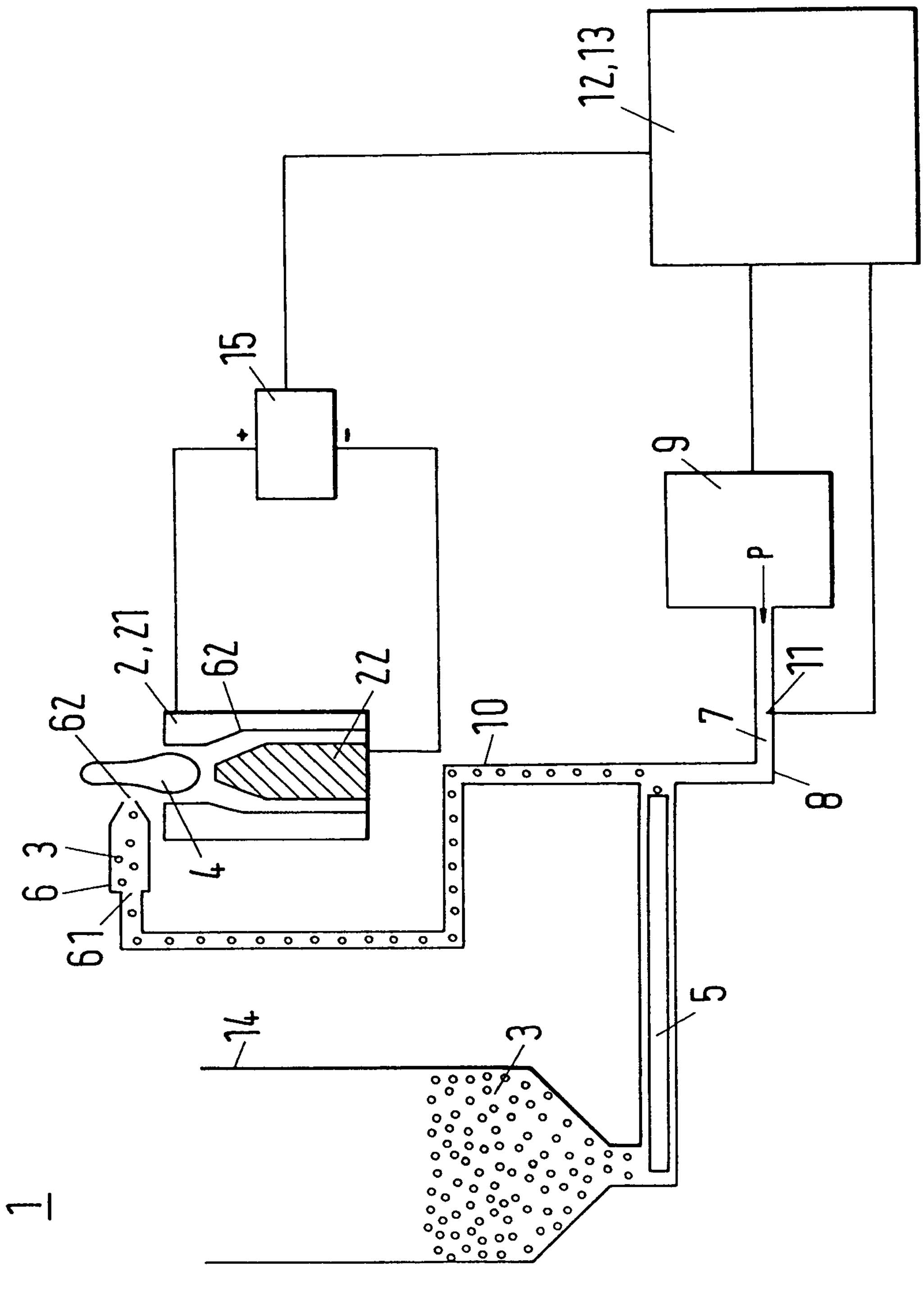
FIG. 1 shows a plasma spraying apparatus with a monitoring unit and a control unit.

FIG. 1 shows in a schematic illustration a plasma spraying apparatus in accordance with the invention which is referred to as a whole with the reference numeral 1 in the following.

The plasma spraying apparatus 1 in accordance with the invention includes, in a manner known per se, a plasma torch 2 with an injector unit 6 for heating a spray powder 3 in a heating zone 4. The injector unit 6 has an inlet 61 and an outlet 62 designed as a powder injector 62, so that spray powder can be brought into the heating zone 4 by means of the powder injector 62 by means of a conveyor gas 7 under a predetermined pressure P via an injector line 10, which is connected with the inlet 61.

A metering unit 5 is provided for metering the spray powder 3 which is brought into the heating zone 4 of the plasma spraying apparatus 1 during plasma spraying. The spray powder 3 can be supplied to the metering unit 5 out of a storage container 14 so that the spray powder 3 can be metered by the metering unit 5. The spray powder 3 can be supplied from the metering unit 5 to the injector line 10, which is not only connected to the metering unit 5 but also to the conveyor gas line 8. The conveyor gas line 8 is fed with conveyor gas 7 from conveyor gas unit 9, so that the spray powder 3 can be supplied out of the metering unit 5 into the injector unit 6 with the help of the conveyor gas 7, wherein the conveyor gas unit 9 prepares the conveyor gas 7 under a predetermined pressure P. In this special case further parameters of the conveyor gas 7 can also be predetermined by the conveyor gas unit 9, such as for example the flow quantity, the temperature, the composition, and also further parameters of the conveyor gas 7 which are relevant to operation.

The plasma torch 2 is designed as an anode 21, at least in the region of the heating zone 4, so that a plasma can be triggered in cooperation with the cathode 22, so that the spray powder 3 brought into the heating zone 4 can be heated in the operating condition of the plasma spraying apparatus and a surface layer can, for example, be sprayed onto a workpiece using the melted spray powder in a manner known per se.

In the embodiment shown here a pressure sensor 11 is provided in the conveyor gas line 8 to detect the pressure P of the conveyor gas 7 and is preferably, but not necessarily, a piezoelectric pressure sensor 11. The pressure sensor 11 is connected signal-wise with a monitoring unit 12 for monitoring the pressure P of the conveyor gas 7. In the example shown the monitoring unit 12 includes a control unit 13 for the control and/or regulation of the pressure P of the conveyor gas 7 and/or of the through flow quantity of the conveyor gas 7 and/or of a supply quantity of the spray powder 3 and/or of a heating power of the plasma torch 2 and/or of other operating parameters and/or of a system component of the plasma spraying apparatus 1.

In the embodiment shown in FIG. 1 the control unit 13 is connected signal-wise with an electric energy source 15 and the conveyor gas unit 9. By these means, in dependence on the pressure P of the conveyor gas 7 recorded by the pressure sensor 11, not only can the plasma enthalpy of the plasma beam be influenced by control and/or regulation of the electric energy source 15 or by control and/or regulation of the plasma gas, but also the pressure P and/or the through flow quantity of the conveyor gas 7 can be adjusted, for example. If, for example, an abnormal value of the pressure P of the conveyor gas 7 is established by means of the pressure sensor 11, then an operating condition of the plasma spraying apparatus 1 can be correspondingly influenced by the monitoring unit 12 and the control unit 13, which for example can be realized by an electronic data processing system, in particular a computer. Thus, a spraying procedure can, for example, be stopped automatically or, in case of less serious faults, an operating parameter such as for example the plasma enthalpy of the plasma beam, the pressure P of the conveyor gas 7 or other operating parameters can automatically be adapted in such a way that the ongoing spraying procedure can be completed and after the conclusion of the spraying process the necessary repair work and servicing can be undertaken. It goes without saying that the invention is not limited to plasma spraying apparatus of the kind illustrated in FIG. 1, but rather that for example the plasma torch 2, the injector unit 6 or all other system components illustrated in the schematic FIG. 1 can also be designed differently. Corresponding embodiments of plasma spraying apparatus are known per se from the prior art and thus do not need to be described individually here. This means that the invention relates to all possible suitable embodiments of plasma spraying apparatus in which a spray powder can be brought into a heating zone of a plasma torch with the help of a conveyor gas.

Thus the invention makes available a plasma spraying apparatus and also a method for monitoring the condition of a plasma spraying apparatus which allows the condition of the plasma spraying apparatus to be monitored very effectively in a particularly simple manner by measuring the pressure of the conveyor gas, which conveys the spray powder into an injector unit of a plasma torch of the plasma spraying apparatus. In this arrangement completely different faults or damage on components of the plasma spraying apparatus can not only be detected and localized from the measured pressure data, but rather it is also possible in the operating state to control or regulate different parameters of the spraying process, such as the conveyor gas pressure, the plasma enthalpy of the plasma beam or of any other parameter, in such a way that the operating parameters are adapted so that when minor faults or damage occurs, a spraying process can be completed without having to accept losses in the quality of the sprayed layer. Should serious faults or damage occur at one of the system components, then the plasma spraying apparatus can be switched off automatically, for example, so that subsequent damage can be excluded and a workpiece in the process of being coated does not become unusable due to the breakdown.

The invention claimed is:

1. A plasma spraying apparatus including a plasma torch for heating up a spray powder in a heating zone and a metering unit for metering the spray powder, said metering unit being connected to a conveyor gas unit via a conveyor gas line for conveying the spray powder into an injection unit by means of a conveyor gas under a predetermined pressure, wherein the injector unit has an inlet and an outlet designed as a powder injector so that the spray powder can be supplied from the metering unit through the inlet to the injector unit by means of the conveyor gas via an injector line and wherein the injector unit is designed and arranged in such a way that the spray powder can be brought into the heating zone by means of the conveyor gas emerging from the powder injector, and a pressure sensor for the detection of the pressure of the conveyor gas for monitoring the condition of the plasma spraying apparatus.

2. A plasma spraying apparatus in accordance with claim 1 wherein said pressure sensor is provided in the conveyor gas line.

3. A plasma spraying apparatus in accordance with claim 1 wherein said pressure sensor is provided in the injector line.

4. A plasma spraying apparatus in accordance with claim 1 wherein said pressure sensor for monitoring the pressure of the conveyor gas is connected signal-wise with a monitoring unit.

5. A plasma spraying apparatus in accordance with claim 1 wherein said pressure sensor is a mechanical, optical, magnetic pressure sensor or an electric pressure sensor, in particular a piezoelectric pressure sensor.

6. A plasma spraying apparatus in accordance with claim 1 wherein the monitoring unit includes a control unit for the control and/or regulation of the pressure of the conveyor gas and/or of a flowing quantity of the conveyor gas and/or of a supply quantity of the spray powder and/or of a plasma enthalpy of the plasma beam and/or of other operating parameters and/or of a system component of the plasma spraying apparatus.

7. A method for monitoring the condition of a plasma spraying apparatus wherein a spray powder is metered by means of a metering unit, comprising providing an injector unit which has an inlet and an outlet, and which is designed as a powder injector supplying the spray powder to the injector unit from the metering unit through the inlet by means of a conveyor gas under a predetermined pressure via an injector line, bringing the spray powder into a heating zone by means of the conveyor gas emerging from the powder injector, and monitoring the pressure of the conveyor gas by means of a pressure sensor.

8. A method in accordance with claim 7 comprising connecting signal-wise a monitoring unit which includes a control unit to the pressure sensor, detecting the pressure of the conveyor gas by means of the pressure sensor, and monitoring and/or controlling and/or regulating the pressure of the conveyor gas and/or a flow quantity of the conveyor gas and/or a supply quantity of the spray powder and/or a plasma enthalpy of the plasma beam and/or a different operating parameter and/or a system component of the plasma spraying apparatus.

9. A plasma spraying apparatus including a plasma torch for heating up a spray powder in a heating zone and a metering unit for metering the spray powder, said metering unit being connected to a conveyor gas unit via a conveyor gas line for conveying the spray powder into an injection unit by means of a conveyor gas under a predetermined pressure, wherein the injector unit has an inlet and an outlet designed as a powder injector so that the spray powder can be supplied from the metering unit through the inlet to the injector unit by means of the conveyor gas via an injector line, and wherein the injector unit is designed and arranged in such a way that the spray powder can be brought into the heating zone by means of the conveyor gas emerging from the powder injector, and a pressure sensor only for detecting changes in the pressure of the conveyor gas responsive to a faulty operation of the plasma spraying apparatus.

10. A method for monitoring the condition of a plasma spraying apparatus wherein a spray powder is metered by means of a metering unit, comprising providing an injector unit which has an inlet and an outlet, and which is designed as a powder injector supplying the spray powder to the injector unit from the metering unit through the inlet by means of a conveyor gas under a predetermined pressure via an injector line bringing the spray powder into a heating zone by means of the conveyor gas emerging from the powder injector, sensing the pressure of the conveyor gas by means of a pressure sensor only, and determining that the spraying operation is defective in response to changes in the sensed conveyor gas pressure.

* * * * *